US011875634B2

(12) United States Patent
Davis

(10) Patent No.: US 11,875,634 B2
(45) Date of Patent: Jan. 16, 2024

(54) CONTROLLING POWER CONSUMPTION IN ELECTRONIC GAMING MACHINES

(71) Applicant: IGT, Las Vegas, NV (US)

(72) Inventor: Dwayne A. Davis, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/752,907

(22) Filed: May 25, 2022

(65) Prior Publication Data

US 2023/0386290 A1 Nov. 30, 2023

(51) Int. Cl.
*A63F 13/00* (2014.01)
*G07F 17/32* (2006.01)

(52) U.S. Cl.
CPC ................................ *G07F 17/3216* (2013.01)

(58) Field of Classification Search
None
See application file for complete search history.

(56) References Cited

U.S. PATENT DOCUMENTS 7,010,710 B2 * 3/2006 Piazza ................... G06F 1/3231 713/323
7,670,224 B2 * 3/2010 Williams ............ G07F 17/3206 463/43
8,095,814 B2 * 1/2012 O'Connell .............. H04L 12/12 713/323
8,235,810 B2 * 8/2012 Brunet de Courssou .................... G07F 17/32 463/40
8,323,087 B2 12/2012 Chen et al.
8,961,295 B2 2/2015 Bleich et al.
9,235,257 B2 * 1/2016 Richardson ......... G06F 13/4068
11,380,158 B2 * 7/2022 Nguyen ..................... H02J 9/00
2005/0149773 A1 * 7/2005 Kevan ................... G06F 1/3203 713/320
2008/0070652 A1 * 3/2008 Nguyen .............. G07F 17/3232 463/1
2009/0061987 A1 3/2009 Canterbury et al.
2009/0083560 A1 * 3/2009 O'Connell ............ G06F 1/3209 713/323
2009/0131151 A1 * 5/2009 Harris ................. G07F 17/3232 463/22

* cited by examiner

*Primary Examiner* — Sunit Pandya
(74) *Attorney, Agent, or Firm* — Sage Patent Group

(57) ABSTRACT

A system includes a processor circuit and a memory including machine-readable instructions that, when executed by the processor circuit, cause the processor circuit to determine that a first gaming device of a plurality of gaming devices is in a first active state. Based on the determination that the first gaming device is in the first active state, the processor circuit identifies a second gaming device of the plurality of gaming devices in a first proximity to the first gaming device. Based on the determination that the first gaming device is in the first active state and the identification of the second gaming device, the processor circuit modifies a state of the second gaming device to be in a second active state different from the first active state.

20 Claims, 10 Drawing Sheets

600

500

CONTROLLING POWER CONSUMPTION IN ELECTRONIC GAMING MACHINES

BACKGROUND

Embodiments described herein relate to electronic gaming machines (EGMs), and in particular to controlling power consumption in EGMs, and related systems, devices, and methods. EGMs in a gaming environment, such as a casino environment, consume significant amounts of energy when in use, compounded by the number of EGMs in use at any given time, which can number in the hundreds or thousands in larger properties. As the financial and environmental costs of energy use increases, there is a need to more efficiently control power consumption for these EGMs.

SUMMARY

According to an embodiment, a system includes a processor circuit and a memory including machine-readable instructions that, when executed by the processor circuit, cause the processor circuit to determine that a first gaming device of a plurality of gaming devices is in a first active state. The instructions further cause the processor circuit to, based on the determination that the first gaming device is in the first active state, identify a second gaming device of the plurality of gaming devices in a first proximity to the first gaming device. The instructions further cause the processor circuit to, based on the determination that the first gaming device is in the first active state and the identification of the second gaming device, modify a state of the second gaming device to be in a second active state different from the first active state.

According to some embodiments, a method includes determining, by a processor circuit, that a first gaming device of a plurality of gaming devices is in a first active state, the first active state consuming a first amount of power. The method further includes, based on determining that the first gaming device is in the first active state, identifying a second gaming device of the plurality of gaming devices in a first proximity to the first gaming device. The method further includes, based on the determining that the first gaming device is in the first active state and identifying the second gaming device, modifying a state of the second gaming device to be in a second active state, the second active state consuming a second amount of power less than the first amount of power.

According to some embodiments, a system includes a first gaming device, a plurality of second gaming devices within a first proximity to the first gaming device, and a plurality of third gaming devices within a second proximity to the first gaming device, wherein the second proximity if farther from the first gaming device than the first proximity. The system further includes a processor circuit and a memory comprising machine-readable instructions that, when executed by the processor circuit, cause the processor circuit to determine that the first gaming device is in a first active state. The instructions further cause the processor circuit to, based on the determination that the first gaming device is in the first active state, modify a state of the plurality of second gaming devices to be in a second active state different from the first active state. The instructions further cause the processor circuit to, based on the determination that the first gaming device is in the first active state, modify a state of the plurality of third gaming devices to be in a third active state different from the first active state.

DETAILED DESCRIPTION

Embodiments described herein relate to electronic gaming machines (EGMs), and in particular to controlling power consumption in EGMs, and related systems, devices, and methods. In some embodiments, a first gaming device of a plurality of gaming devices is determined to be in a first active state. Based on the determination that the first gaming device is in the first active state, a second gaming device of the plurality of gaming devices in a first proximity to the first gaming device is identified. Based on the determination that the first gaming device is in the first active state and the identification of the second gaming device, a state of the second gaming device is modified to be in a second active state different from the first active state.

In some embodiments, gaming devices may take steps to reduce power consumption and/or heat generation during periods of inactivity. For example, a gaming device may reduce a frequency of displaying an attract sequence or power down components or the entire gaming device, as desired. In some examples, a motion sensor may detect the presence and/or proximity of a potential player, which may cause the gaming device to initiate an attract sequence, power up certain components, and otherwise make the gaming device ready for play before the player initiates play at the gaming device. Certain components may remain powered down in certain states. For example, ticket printers can consume power and generate heat in disproportionate amounts relative to other components of many EGMs, but are primarily needed during cashout operations. Accordingly, in some embodiments, the printer can be kept in a powered down state during game play, even while the gaming device is in an otherwise active state, and can be selectively powered up in response to certain criteria, such as receiving a cashout instruction. The gaming device may also anticipate a likelihood of a certain component being utilized, and may preemptively power up the components to reduce or eliminate any startup delay when the component is needed. For example, an EGM may anticipate that a cashout instruction is likely to be received following a jackpot win, and may power up the printer in response to the jackpot win so that the printer can be powered up in the event a cashout instruction is received.

In some embodiments, a temperature associated with the gaming device can be monitored, and different components can be selectively powered down or up to maintain an desired internal temperature and reduce unnecessary heat generation. In a casino environment with hundreds or thousands of EGMs, even marginal increases in temperature can decrease device and component longevity, and can also result in significant energy costs, both for the EGMs themselves, and for maintaining a comfortable temperature in the casino environment overall.

Figure 1:
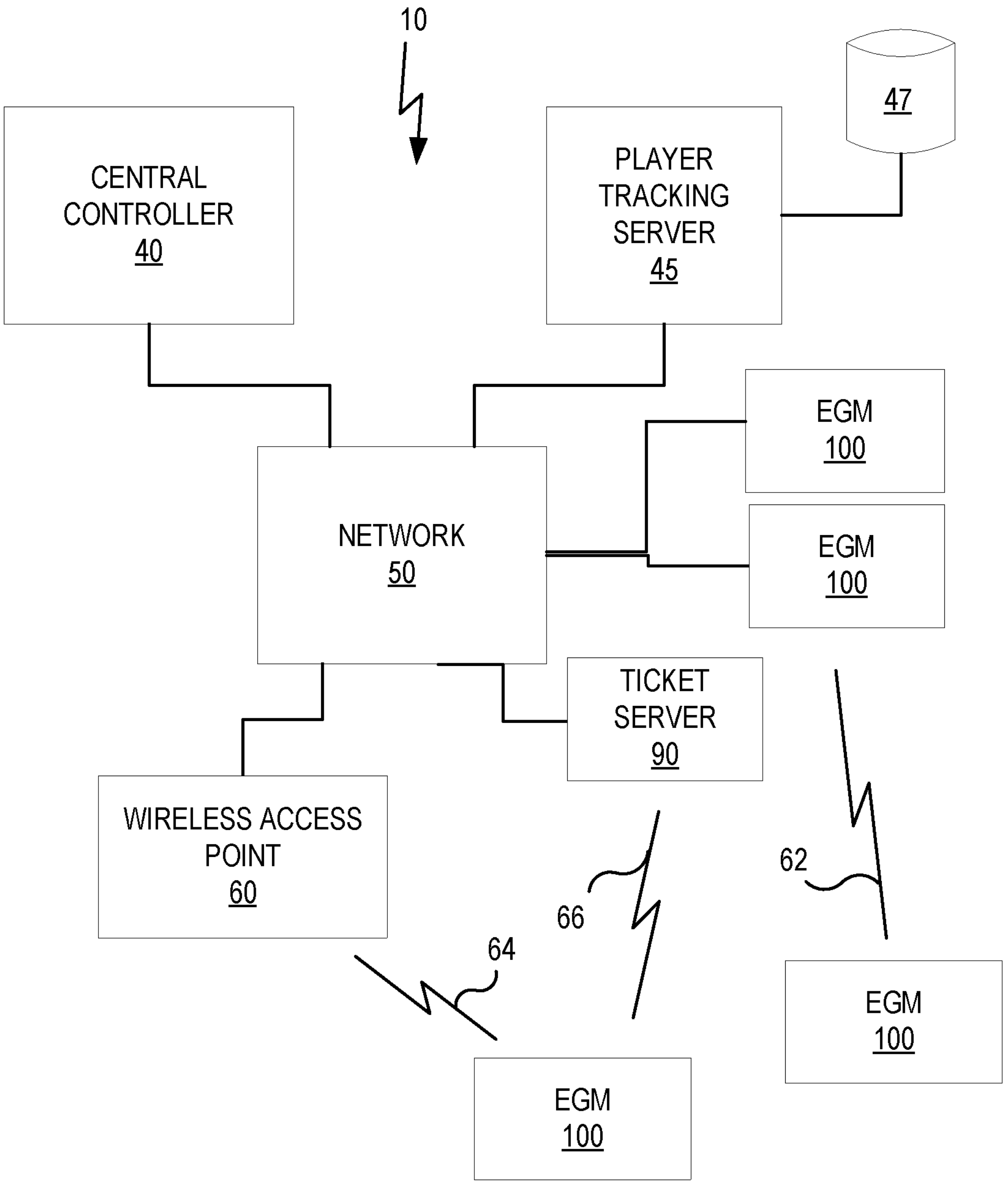
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
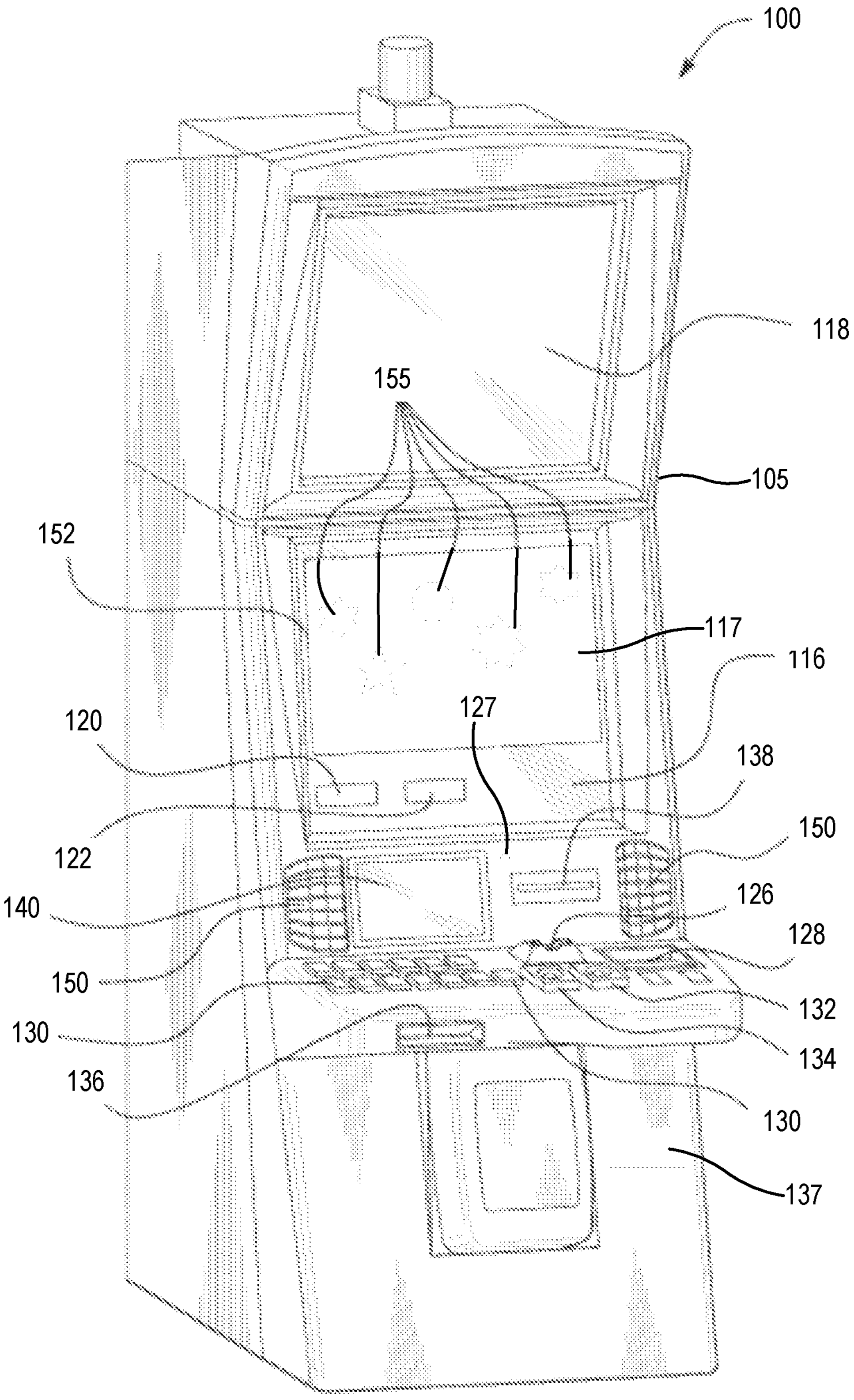
FIGS. 2A to 2E illustrate gaming devices according to various embodiments.
Figure 2B:
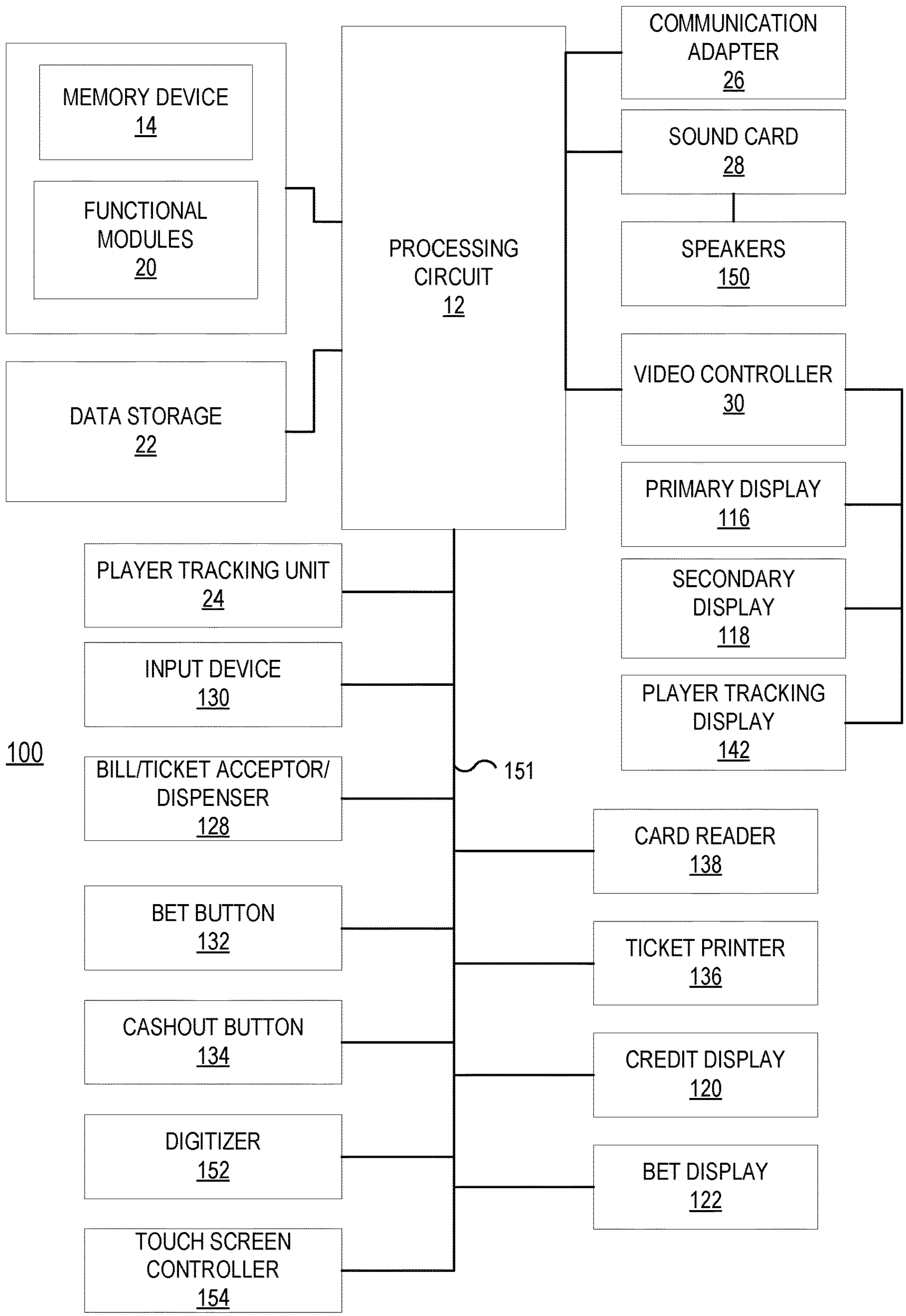
Figure 2C:
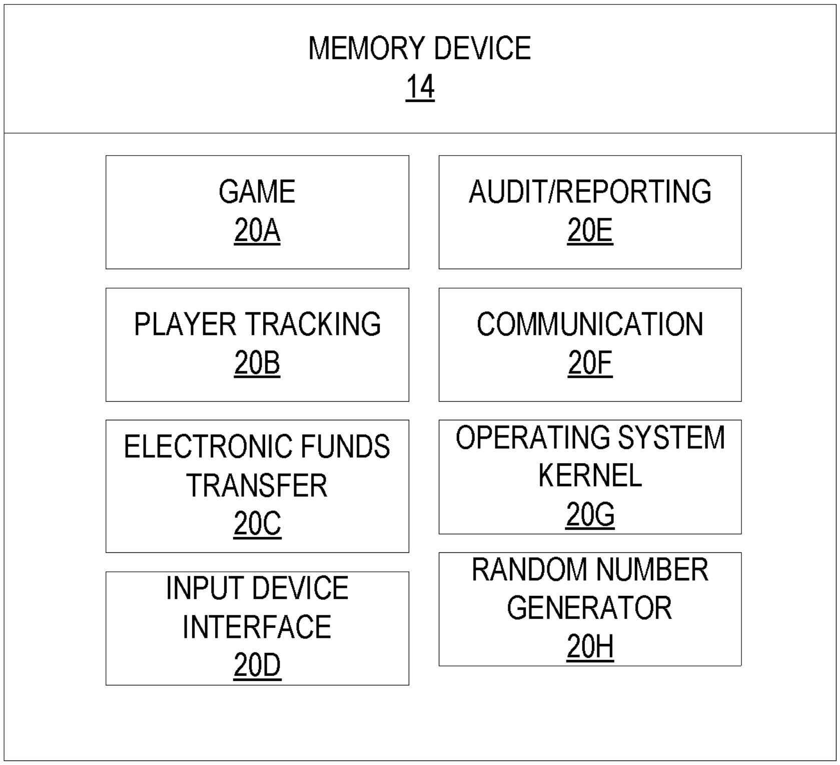

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
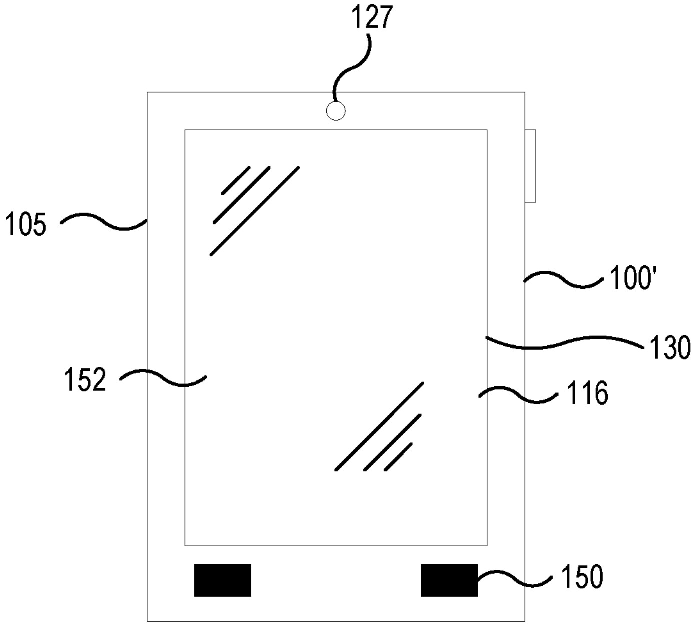

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
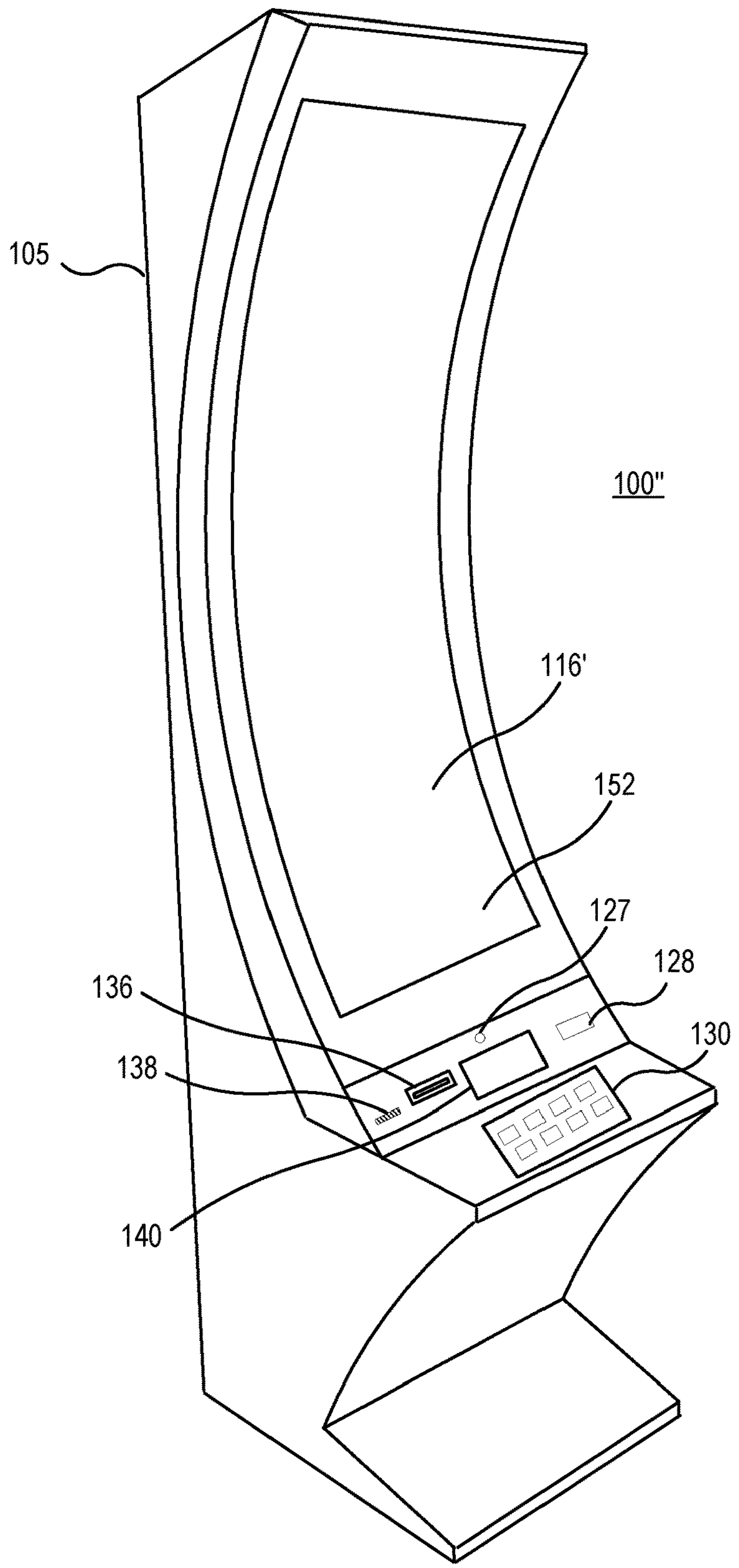

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
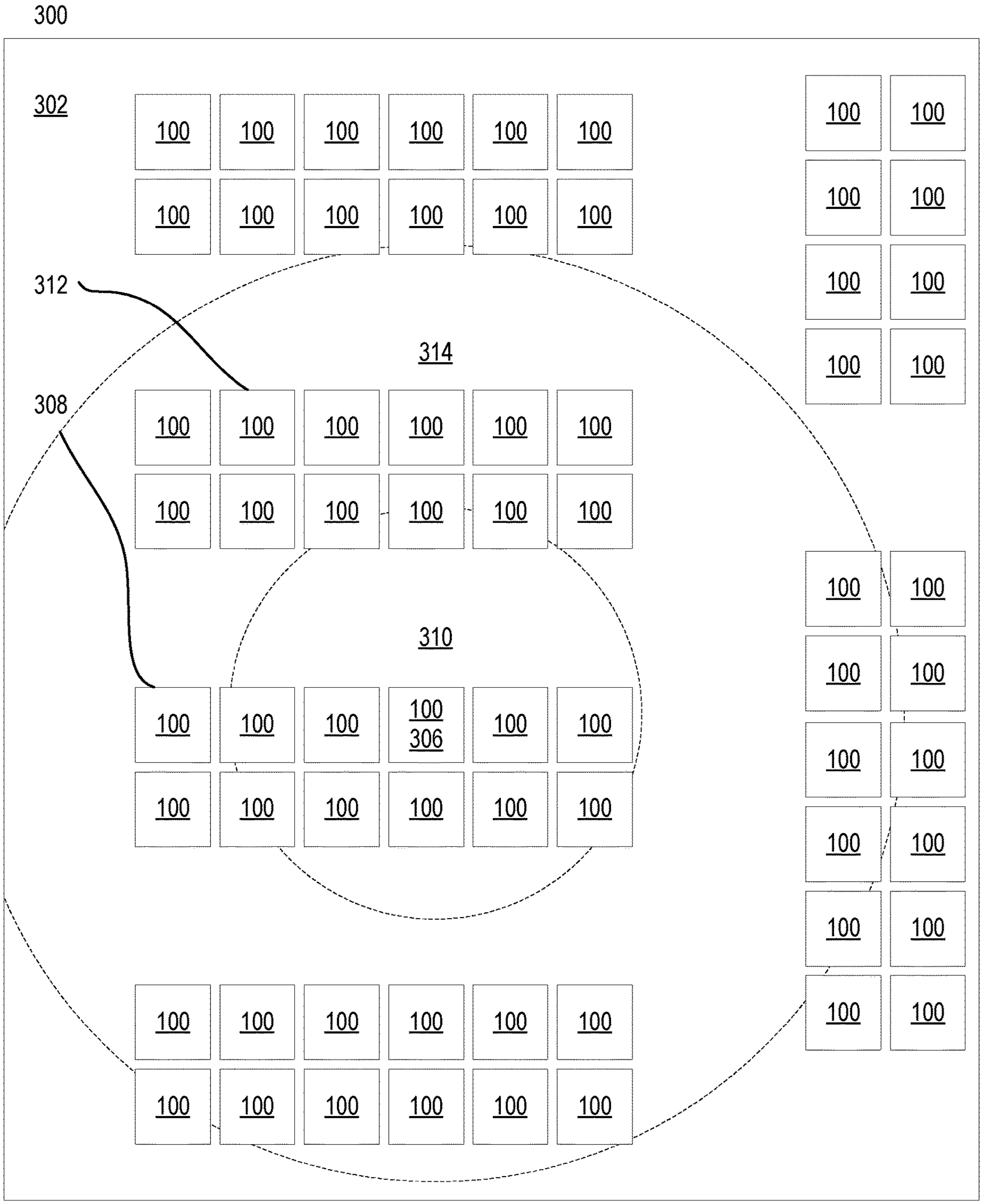
FIGS. 3A and 3B are views of a plurality of EGMs in a gaming environment, such as a casino floor, using energy management techniques based on user proximity, according to some embodiments.
Figure 3B:
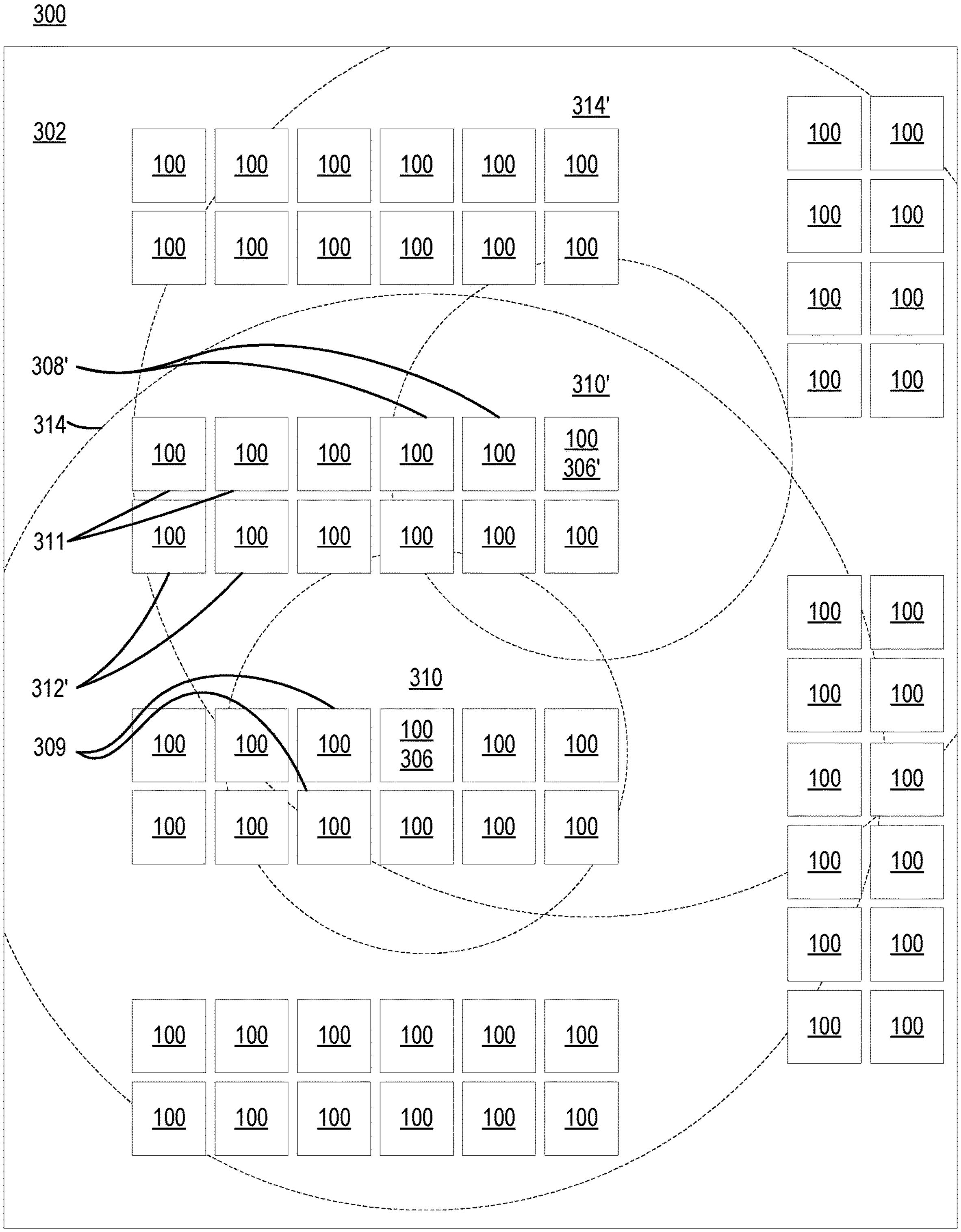

FIGS. 3A and 3B are views of an energy management system 300 including a plurality of gaming devices 100 in a gaming environment, according to some embodiments. In this example, the gaming devices 100 are EGMs arranged on a casino floor 302, but it should be understood that different types of EGMs and/or locations may be used. The system 300 first determines that a first gaming device 306 is in a first active state. For example, the first active state may be a state where the first gaming device 306 is actively being used by a user, or a state where the first gaming device 306 detects and/or determines that a user is in front of or approaching the first gaming device 306. The active state may also be determined based on other criteria indicative of active or recent use, such as a determination that the gaming device 100 has a non-zero credit meter balance, for example. Conversely, in some examples, a zero credit meter balance may be indicative of an inactive state. Alternatively, or in addition, a lack of activity for a predetermined time, or a lack of a threshold level of activity for a predetermined time may be indicative of an inactive state.

In the first active state in this example, the first gaming device 306 is fully powered on, with the display(s) powered on and active, input devices active and ready to receive input, and relatively high energy consuming peripheral components such as the bill acceptor/dispenser and ticket printer in an active and powered on state. The first active state is appropriate for the first gaming device 306, which is in active used and/or is expected to be in active use.

Based on the first gaming device 306 being in a first active state, a group of second gaming devices 308 are identified within a first proximity 310 of the first gaming device. In this example, the second gaming devices 308 are all of the gaming devices 100 that are within a predetermined distance from the first gaming device 306 in any direction. It should be understood, however, that other additional or alternative criteria may be used to select the second gaming devices 308, such as determining whether the second gaming device 308 is in a line of sight of the display of the first gaming device 306, i.e., whether the display of the first gaming device 306 is visible from the location of the second gaming device 308, discussed below with respect to FIG. 5. Proximity can be determined based on mapping data, e.g., with all of the gaming devices 100 being placed at known locations on the casino floor 302, or by other means, such as peer to peer communication, determining wireless signal strength (e.g., WiFi, Bluetooth, etc.) between gaming devices 100, etc.

Based on the first gaming device 306 being in the first active state and the identification of the second gaming devices 308, the system modifies the states of the second gaming devices 308 to each be in a second active state different from the first active state. In this embodiment, the second active state is a lower power state than the first active state. Additionally, or alternatively, the second active state may include a second operating temperature that is lower than an operating temperature of the first active state. For example, different components of the gaming devices 100 may be in an active state, e.g., powered on, awake, etc., or an inactive state, e.g., powered off, in standby, sleeping, etc., as desired. For example, the second active state may be a partially powered up state, with the displays of the second gaming devices 308 being active, to indicate to a potential user that the gaming device 308 is operational and ready to be used. Certain components, such as card readers and input devices, may also be active in the second active state so that a user can immediately approach and begin playing at the gaming device 308 without waiting for the gaming device 308 to power on. However, in this second active state, some other peripheral components, such as a ticket printer, of each second gaming device 308 may be kept powered down to avoid unnecessary energy use and/or heat generation.

An operating temperature of the gaming device and/or components thereof may be determined by one or more temperature sensors disposed in the gaming device 100 and/or associated with certain components of the gaming device 100. For example, a player tracking unit, such as the player tracking unit 24 of FIG. 2B, may include a temperature sensor. One advantage of integrating the temperature sensor into the player tracking unit is that the temperature sensor will measure an internal temperature in the gaming device 100, as opposed to an outside, ambient temperature in the casino environment (which may be more easily measured using other temperature sensors). As noted above, player tracking units are commonly standardized across different products within a manufacturer's lineup, thereby allowing for more efficient deployment of temperature sensors across a number of different types gaming devices 100. The temperature sensor may also be used to monitor the interior of the gaming device 100 for abnormal temperature variations, which may be indicative of a malfunction or a dirty interior, and may be used to automatically initiate a service and/or cleaning request for the gaming device 100.

In some examples, additional groups of gaming devices 100 may be identified at different proximities. For example, in this embodiment, a group of third gaming devices 312 are identified within a second proximity 314 of the first gaming device, i.e., all of the gaming devices 100 that are outside the first proximity 320, but that are also within a larger predetermined distance from the first gaming device 306. Based on the first gaming device 306 being in the first active state and the identification of the third gaming devices 312, the system modifies the states of the second gaming devices 312 to each be in a third active state different from the first active state and the second active state.

As with the second active state, the third active state may be a lower power state than the first active state or the second active state. The third active state may also comprise a lower operating temperature than the than the first active state or the second active state. For example, the third active state may include the displays of the third gaming devices 308 being active, but with additional components, such as card readers and input devices remaining inactive, to further reduce power consumption and/or heat generation.

The number and types of different active states may be modified as desired. For example, the second active state may be reserved for gaming devices 100 in the immediate vicinity of the first gaming device 306, so that the user of the first gaming device 306 can easily change to a nearby second gaming device 308 or so that a friend of the user can begin playing a nearby second gaming device 308 without waiting for the components of the second gaming device to power up. There may be a lower probability, however, of one of the third gaming devices 312 becoming active, since the third gaming devices 312 are farther away from the active first gaming device 306. Accordingly, it may be determined that the benefits of keeping the third gaming devices 312 in a lower energy and/or lower heat active state outweigh the drawbacks of delay in powering up to facilitate game play.

The system 300 may also determine that the first gaming device 306 has transitioned from the first active state to a first inactive state. For example, if it is determined that the user has stopped playing the first gaming device 306 and/or has walked away from the first gaming device 306, the first gaming device 306 may power down certain components to reduce energy consumption and/or heat generation. Based on the determination that the first gaming device is in the first inactive state, the second gaming devices 308 and/or the third gaming devices 312 can also be transitioned from their respective active states to inactive states. The inactive states for the different groups of gaming devices can be the same inactive states, e.g., powered down, standby, sleep, etc., or can be different from each other. For example, the third gaming devices 312 might completely power down, while the second gaming devices 308 might enter a state similar to the third active state, i.e., with the display active and input and other peripheral components inactive.

For example, many casino systems employ multiple hardware devices inside an EGM cabinet, such as a System Machine Interface Board (SMIB), which contains logic to communicate with the EGM and the system, and a Universal Game Adapter (UGA), which is a mixer of video, audio, and touch screen, and which can be used to provide picture-in-picture mixing of system content from the SMIB and game content from the EGM on the screen at the same time. In some embodiments, the video memory in the UGA may be used to provide on-screen display of content while allowing the primary processor of the EGM to enter a reduced power state. In this mode, the UGA keeps the screen awake with the most recently displayed image, while the primary processor and other components of the EGM are in the reduced power state. In some examples, the UGA could record a period of time, e.g., 30-60 seconds of non-game activity, and play the recording on a loop as an attract mode for the EGM while the EGM components are in an otherwise reduced power state. The SMIB may also be configured to have a low-power mode for monitoring critical functions, but that returns to a full power mode in response to instructions from motions sensors, proximity alerts, etc. Alternatively, or in addition, the UGA could be configured with predetermined images and/or videos for this low power state. For example, the images could advertise the game, casino, restaurants, etc. while the EGM components are otherwise in a low-power/inactive state.

As shown in FIG. 3B, gaming devices 100 can be placed into different active and/or inactive states based on their proximity to different active gaming devices 100, and/or more than one active gaming device 100. In this example, another active gaming device 306' is modified to be in the first active state, such as in response to receiving an input from a user and/or in response to detecting motion in an area adjacent to the gaming device 306'. Based on this gaming device 306' being in the first active state, another group of second gaming devices 308' in a first proximity 310' is modified to be in the second active state and another group of third gaming devices 312' in a second proximity 314' is modified to be in the third active state. In this example, the second active state overrides the third active state, so that gaming devices 309 in a region where a first proximity 310, 310' and a second proximity 314, 314' overlap will default to the second active state, e.g., higher power active state. It should be understood, however, that other configurations may be used. In some embodiments, for example, gaming devices 311 that are not within a first proximity 310, 310' of an active gaming device 306, 306', but that are within the second proximity 314, 314' of both active gaming devices 306, 306' may be placed into another active state, e.g., an intermediate power state between the second active state and the third active state.

Different active and inactive states may have different configurations of active and inactive components and/or functionality. For example, in some embodiments, an active "in-play" state may be defined as the gaming device having a credit balance and game play within the last 120 seconds. An active "ready" state may be defined as the gaming having a credit balance, but with no game play within the last 120 seconds. An idle "player near" state may be defined as being near a gaming device in an active in-play or ready state, e.g., within a predetermined distance and or positions of the active gaming device. An idle "periphery" state may be defined as the gaming device being near a gaming device in the idle player near state. An idle "unaware" state may be defined as the gaming device not being near a game in an active state. These and other states may be defined as active or inactive on a sliding scale, with different degrees and configurations of activity and/or inactivity, as desired.

Figure 4:
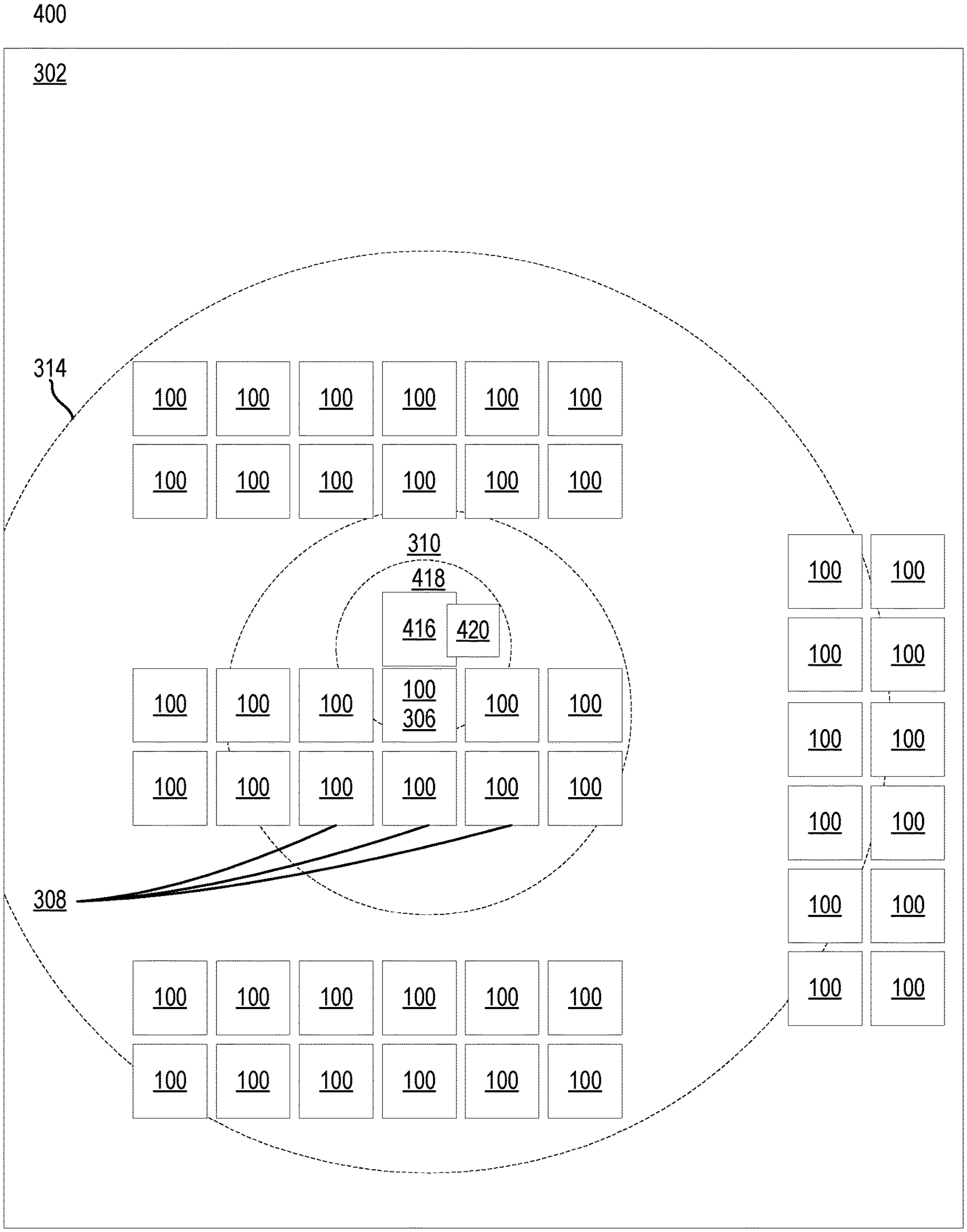
FIG. 4 is a view of a plurality of EGMs in a gaming environment, such as a casino floor, using energy management techniques based on mobile device interaction, according to some embodiments.

In another embodiment, FIG. 4 is a view of an energy management system 400 including a plurality of gaming devices 100 in a gaming environment, such as a casino floor 302, according to some embodiments. In this example, a user 416 holding or carrying a mobile device 420, such as a phone or tablet, may approach a first gaming device 306. The gaming device 306 may detect and/or communicate with the mobile device 420 and may, as a result, enter the first active state. For example, the first gaming device may receive a message from the mobile device 420 associated with the user 416. The message may be an input request input into the mobile device 420 by the user 416, and/or a wireless connection request that may be generated automatically by the mobile device. For example, the mobile device 420 and/or first gaming device 306 may be configured to automatically detect and/or communicate with devices within a predetermined range 418 of the first gaming device 306, or based on other criteria, such as a detected signal strength of the mobile device 420 and/or first gaming device 306 etc.

Based on receipt of the message, the state of the first gaming device 306 is modified to be in the first active state. Based on the first gaming device 306 being in the first active state a group of second gaming devices 308 in a first proximity 310 may be placed in the second active state, a group of third gaming devices 312 in a second proximity 314 may be placed in the third active state, etc.

Figure 5:
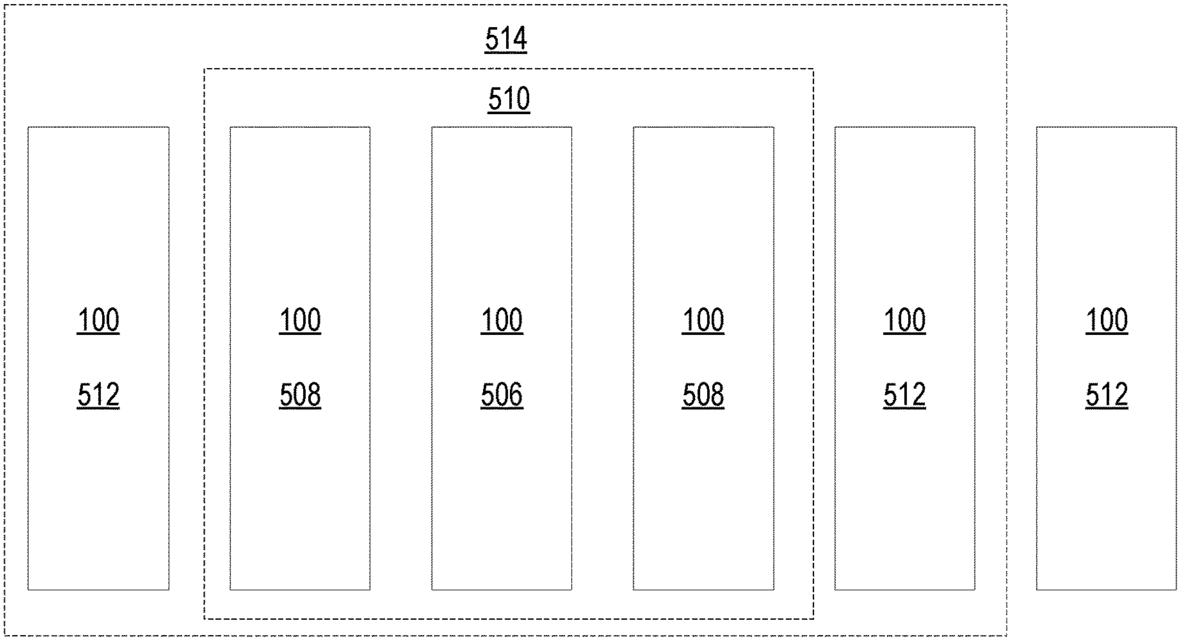
FIG. 5 is a view of a plurality of EGMs in a gaming environment, such as a casino floor, using energy management techniques based on location zones, according to some embodiments.

In another embodiment, FIG. 5 is a view of an energy management system 500 including a plurality of gaming devices 100 in a gaming environment. In this example, the gaming devices 100 are arranged in a row, e.g., as a bank of EGMs, such that the displays of the gaming devices 100 are visible to an observer facing the gaming devices 100. In this example, the determination that a first gaming device 506 is in a first active state causes the system 500 to define a plurality of location zones relative to the first gaming device 506. For example, in this example, a first zone 510 includes the immediately adjacent gaming devices 508, which are placed into a second active state. A second zone 514 may include the next immediately adjacent gaming devices 512, which are placed into a third active state, etc.

In this example, zones 510, 514 may be used to identify a plurality of second gaming devices within a predetermined number of positions adjacent to the first gaming device. For example, the zones 510, 514 may be defined based on a combination of distance from the first gaming device 508, and may also be defined based on whether certain included gaming devices 100 in a line of sight of the display of the first gaming device 506. Here, while other gaming devices may be within a predetermined distance of the first gaming device 506, e.g., behind the first gaming device 506 facing in an opposite direction, it may be desirable to limit the gaming devices 100 that are placed into the second active state to the devices 508 that are both within the predetermined distance and that are also visible from the location of the second gaming device 308.

Figure 6:
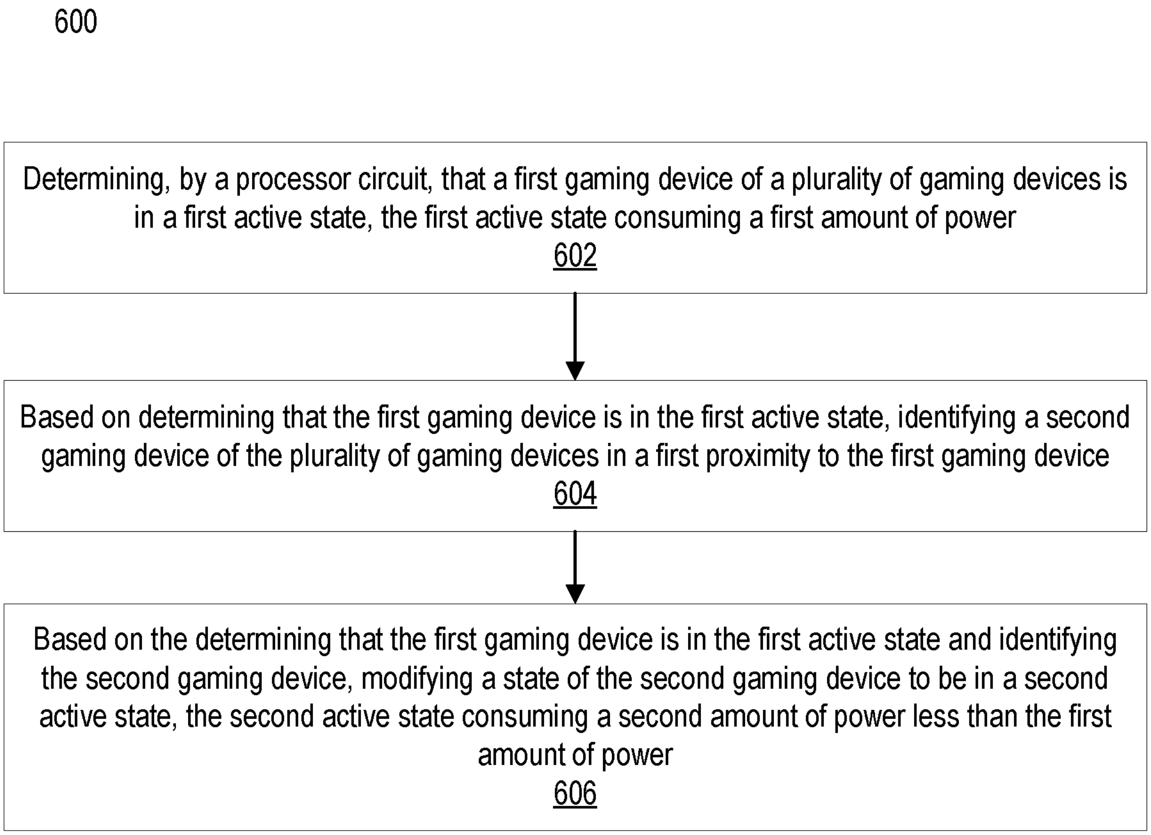
FIG. 6 is a flowchart illustrating operations of systems/methods according to some embodiments.

FIG. 6 is a flowchart illustrating operations 600 of systems/methods according to some embodiments. The operations 600 include determining, by a processor circuit, that a first gaming device of a plurality of gaming devices is in a first active state, the first active state consuming a first amount of power (Block 602). For example, the systems 300, 400, 500 discussed above with respect to FIGS. 3A-5, may include first gaming devices 306, 306', 506, that may be determined to be in a first active state.

The operations 600 further include, based on determining that the first gaming device is in the first active state, identifying a second gaming device of the plurality of gaming devices in a first proximity to the first gaming device (Block 604). In some examples, the second gaming device may be any one or more of the second gaming devices 308, 308', 508, discussed above with respect to FIGS. 3A-5. In some examples, identifying the second gaming device of the plurality of gaming devices in a first proximity to the first gaming device may include identifying a plurality of second gaming devices within a predetermined number of positions adjacent to the first gaming device. For example, as discussed above with respect to FIG. 5, zones 510, 514 may be defined based on a combination of distance and visibility with respect to a first gaming device 506.

The operations 600 further include, based on the determining that the first gaming device is in the first active state and identifying the second gaming device, modifying a state of the second gaming device to be in a second active state, the second active state consuming a second amount of power less than the first amount of power. As discussed above, with respect to FIGS. 3A-5, the second active state can additionally, or alternatively, have a lower operating temperature than the first active state.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a “circuit,” “module,” “component,” or “system.” Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the “C” programming language, Visual Basic, Fortran 2003, Perl, COBOL 2002, PHP, ABAP, dynamic programming languages such as Python, Ruby and Groovy, or other programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms “a”, “an” and “the” are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory comprising machine-readable instructions that, when executed by the processor circuit, cause the processor circuit to:

determine that a first gaming device of a plurality of gaming devices is in a first active state;

based on the determination that the first gaming device is in the first active state, identify a second gaming device of the plurality of gaming devices in a first proximity to the first gaming device; and based on the determination that the first gaming device is in the first active state and the identification of the second gaming device, modify a state of the second gaming device to be in a second active state different from the first active state.

2. The system of claim 1, wherein the first active state is a high power state, and wherein the second active state is a lower power state than the first active state.

3. The system of claim 1, wherein the first active state comprises a first operating temperature, and wherein the second active state comprises a second operating temperature lower than the first operating temperature.

4. The system of claim 1, wherein the instructions further cause the processor circuit to:

detect motion in an area adjacent to the first gaming device; and based on the detection of motion, modify the state of the first gaming device to be in the first active state, wherein the determination that the first gaming device is in the first active state is based on the modification of the state of the first gaming device to be in the first active state.

5. The system of claim 1, wherein the instructions further cause the processor circuit to:

receive a message comprising an input instruction from a mobile device associated with a user; and based on receipt of the message, modify the state of the first gaming device to be in the first active state, wherein the determination that the first gaming device is in the first active state is based on the modification of the state of the first gaming device to be in the first active state.

6. The system of claim 1, wherein the instructions further cause the processor circuit to:

receive a message comprising a wireless connection request from a mobile device associated with a user; and based on receipt of the message, modify the state of the first gaming device to be in the first active state, wherein the determination that the first gaming device is in the first active state is based on the modification of the state of the first gaming device to be in the first active state.

7. The system of claim 1, wherein the instructions further cause the processor circuit to:

receive an input from a user at a user input device of the first gaming device; and based on receipt of the input, modify the state of the first gaming device to be in the first active state, wherein the determination that the first gaming device is in the first active state is based on the modification of the state of the first gaming device to be in the first active state.

8. The system of claim 1, wherein the instructions further cause the processor circuit to:

determine that the first gaming device comprises a non-zero credit meter balance, wherein the determination that the first gaming device is in the first active state is based on the determination that the first gaming device comprises the non-zero credit meter balance.

9. The system of claim 1, wherein each gaming device of the plurality of gaming devices comprises a first component, wherein the first active state of the first gaming device comprises the first component of the first gaming device in an active state, and wherein the second active state of the first gaming device comprises the first component of the first gaming device in an inactive state.

10. The system of claim 9, wherein the first component comprises a printer.

11. The system of claim 9, wherein the first component comprises a display device.

12. The system of claim 1, wherein the instructions further cause the processor circuit to:

determine that the first gaming device has transitioned from the first active state to a first inactive state; and based on the determination that the first gaming device is in the first inactive state, transition the second gaming device from the second active state to a second inactive state.

13. The system of claim 12, wherein the first active state is a high power state, wherein the first inactive state is a lower power state than the first active state, wherein the second active state is a lower power state than the first active state, and wherein the second inactive state is a lower power state than the second active state.

14. The system of claim 12, wherein the first inactive state comprises a first operating temperature, and wherein the second inactive state comprises a second operating temperature lower than the first operating temperature.

15. The system of claim 1, wherein the instructions further cause the processor circuit to:

based on the determination that the first gaming device is in the first active state, identify a third gaming device of the plurality of gaming devices in a second proximity to the first gaming device, wherein the second proximity if farther from the first gaming device than the first proximity; and based on the determination that the first gaming device is in the first active state and the identification of the third gaming device, modify a state of the third gaming device to be in a third active state different from the first active state and the second active state.

16. The system of claim 15, wherein the instructions further cause the processor circuit to:

determine that the first gaming device has transitioned from the first active state to a first inactive state; and based on the determination that the first gaming device is in the first inactive state, transition the second gaming device from the second active state to a second inactive state and transition the third gaming device from the third active state to a third inactive state.

17. A method comprising:

determining, by a processor circuit, that a first electronic gaming machine (EGM) of a plurality of EGMs in a casino environment is in a first active state, each EGM of the plurality of EGM being selectively operable to be in the first active state consuming a first amount of power and a second active state consuming a second amount of power less than the first amount of power;

based on determining that the first EGM is in the first active state, identifying a second EGM of the plurality of EGM as being in a first proximity to the first EGM; and based on the determining that the first EGM is in the first active state and identifying the second EGM, modifying a state of the second EGM to be in the second active state.

18. The method of claim 17, wherein the plurality of EGMs comprises a row of adjacent EGMs, and wherein identifying the second EGM of the plurality of EGM as being in a first proximity to the first EGM comprises identifying a plurality of second EGMs within a predetermined number of positions adjacent to the first EGM.

19. A system comprising:

a first gaming device;

a plurality of second gaming devices within a first proximity to the first gaming device;

a plurality of third gaming devices within a second proximity to the first gaming device, wherein the second proximity if farther from the first gaming device than the first proximity;

a processor circuit; and a memory comprising machine-readable instructions that, when executed by the processor circuit, cause the processor circuit to:

determine that the first gaming device is in a first active state; and based on the determination that the first gaming device is in the first active state, modify a state of the plurality of second gaming devices to be in a second active state different from the first active state; and based on the determination that the first gaming device is in the first active state, modify a state of the plurality of third gaming devices to be in a third active state different from the first active state.

20. The system of claim 19, wherein the instructions further cause the processor circuit to:

determine that the first gaming device has transitioned from the first active state to a first inactive state; and based on the determination that the first gaming device is in the first inactive state, transition the plurality of second gaming devices from the second active state to a second inactive state and transition the plurality of third gaming devices from the third active state to a third inactive state.

* * * * *